US012609526B2

(12) United States Patent
Averill et al.

(10) Patent No.: US 12,609,526 B2
(45) Date of Patent: Apr. 21, 2026

(54) SYSTEMS AND METHODS FOR PROVIDING SELF-POWERED TIMED POWER ISOLATION CIRCUIT

(71) Applicant: Harris Global Communications, Inc., Rochester, NY (US)

(72) Inventors: Eric Sean Averill, Victor, NY (US); Stanley Earl Orford, II, Sun City, AZ (US); Nicholas Bruno, Spencerport, NY (US)

(73) Assignee: L3Harris Global Communications, Inc., Melbourne, FL (US)

( * ) Notice: Subject to any disclaimer, the term of this patent is extended or adjusted under 35 U.S.C. 154(b) by 323 days.

(21) Appl. No.: 18/415,082

(22) Filed: Jan. 17, 2024

(65) Prior Publication Data

US 2025/0233410 A1 Jul. 17, 2025

(51) Int. Cl.
*H02H 9/04* (2006.01)
*H02H 1/00* (2006.01)

(52) U.S. Cl.
CPC ............ *H02H 9/04* (2013.01); *H02H 1/0007* (2013.01)

(58) Field of Classification Search
CPC .......... H02H 9/04; H02H 1/0007; H02H 1/06; H02H 3/023; H02H 5/005
See application file for complete search history.

(56) References Cited

U.S. PATENT DOCUMENTS

| | | | |
|---|---|---|---|
| 4,687,622 A | 8/1987 | Longden | |
| 5,010,321 A | 4/1991 | Larner et al. | |
| 5,672,918 A | 9/1997 | Kimbrough et al. | |
| 6,064,555 A | 5/2000 | Czajkowski et al. | |
| 6,879,140 B2 | 4/2005 | Elkin et al. | |
| 9,007,087 B2 | 4/2015 | Avritch et al. | |
| 9,356,450 B2 * | 5/2016 | Jeon ........................ H02J 9/061 | |
| 9,431,817 B2 | 8/2016 | Hingorani et al. | |
| 10,446,234 B2 | 10/2019 | Chakrabartty et al. | |
| 2008/0266734 A1 | 10/2008 | Miller | |
| 2013/0207695 A1 | 8/2013 | Jeon et al. | |
| 2014/0103955 A1 * | 4/2014 | Avritch ................. G01R 31/64 324/764.01 | |
| 2023/0108660 A1 * | 4/2023 | Bradley ................... G21H 7/00 361/91.6 | |
| 2023/0296657 A1 * | 9/2023 | Bradley ............. G01R 29/0814 324/76.11 | |

* cited by examiner

*Primary Examiner* — Scott Bauer
*Assistant Examiner* — Nicolas Bellido
(74) *Attorney, Agent, or Firm* — Fox Rothschild LLP; Carol E. Thorstad-Forsyth

(57) ABSTRACT

A circuit comprising: an input power source; an input power regulator connected to the input power source and configured to supply regulated power to circuit component(s); a transient event detector configured to detect a transient event; a timer circuit configured to change a signal on a line connecting the timer circuit to the circuit component(s) when the transient event is detected (wherein the change of the signal (i) causes supply of the regulated power to be discontinued and (ii) causes power or energy storage devices of the circuit component(s) to be discharged to ground); and a passive energy storage device configured to supply an amount of power to operate the timer circuit at least through the transient event, while the input power source is electrically isolated from the passive energy storage device and the timer circuit.

19 Claims, 4 Drawing Sheets

400

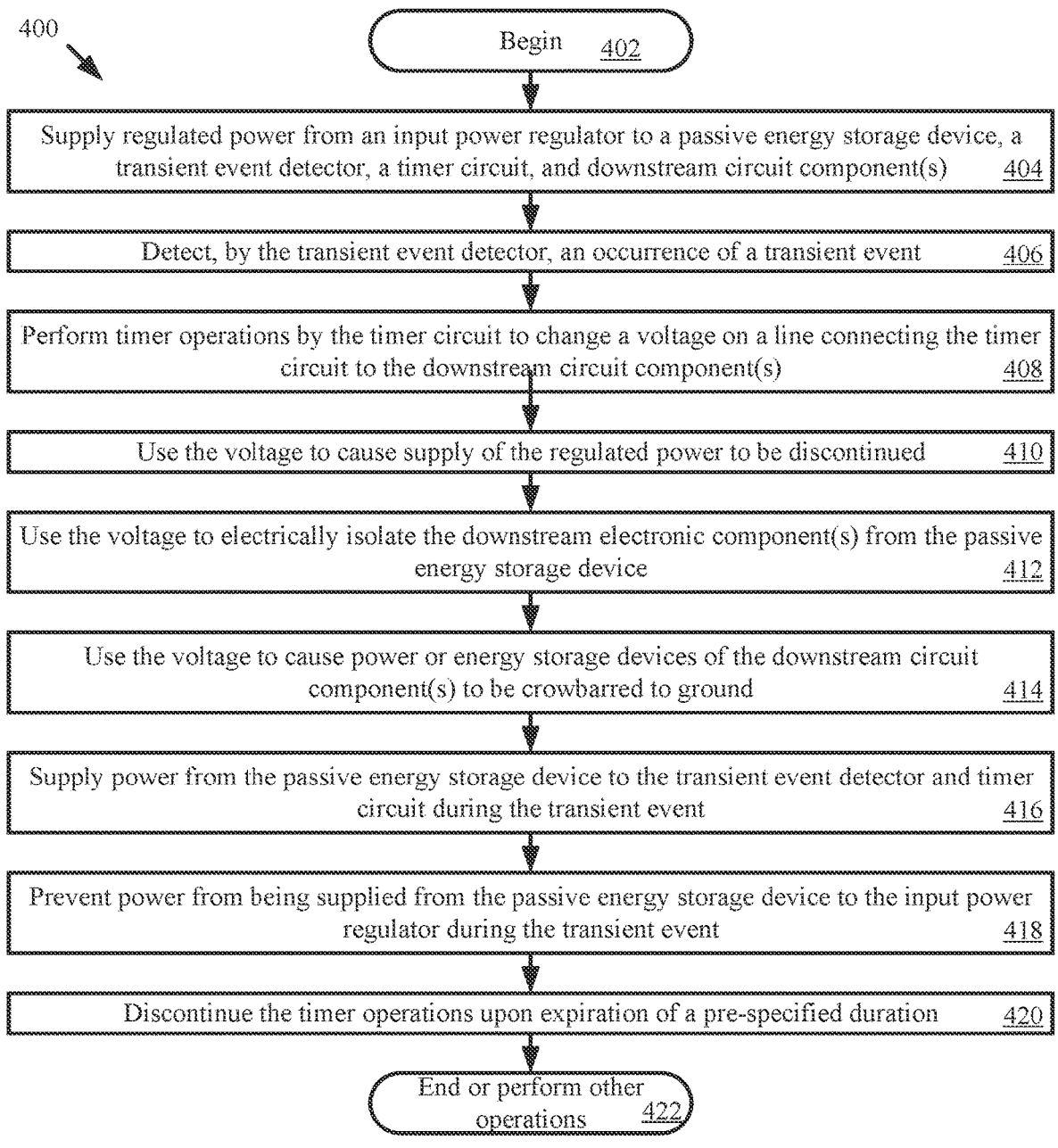

Begin    402

Supply regulated power from an input power regulator to a passive energy storage device, a transient event detector, a timer circuit, and downstream circuit component(s)     404

Detect, by the transient event detector, an occurrence of a transient event     406

Perform timer operations by the timer circuit to change a voltage on a line connecting the timer circuit to the downstream circuit component(s)     408

Use the voltage to cause supply of the regulated power to be discontinued     410

Use the voltage to electrically isolate the downstream electronic component(s) from the passive energy storage device     412

Use the voltage to cause power or energy storage devices of the downstream circuit component(s) to be crowbarred to ground     414

Supply power from the passive energy storage device to the transient event detector and timer circuit during the transient event     416

Prevent power from being supplied from the passive energy storage device to the input power regulator during the transient event     418

Discontinue the timer operations upon expiration of a pre-specified duration     420

End or perform other operations    422

FIG. 4

SYSTEMS AND METHODS FOR PROVIDING SELF-POWERED TIMED POWER ISOLATION CIRCUIT

BACKGROUND

Description of the Related Art

Electronic devices are used in intense radiation environments in which nuclear events occur. The electronic device can be damaged and/or malfunction as a result of the nuclear events. Solutions are needed to address this issue.

SUMMARY

This document concerns a circuit. The circuit comprises: an input power source; an input power regulator connected to the input power source and configured to supply regulated power to circuit component(s); a transient event detector configured to detect a transient event (e.g., a nuclear event); and a timer circuit configured to change a signal on a line connecting the timer circuit to the circuit component(s) when the transient event is detected. The change of the signal may (i) cause supply of the regulated power to be discontinued, (ii) cause power or energy storage devices of the circuit component(s) to be discharged to ground, and (iii) cause an electrical isolation of the input power source from a passive energy storage device, the transient event detector and the timer circuit. The passive energy storage device is configured to supply an amount of power to operate the timer circuit at least through the transient event, while the input power source is electrically isolated therefrom. The electrical isolation may be provided by a power gate creating an open circuit condition between the input power source and the input power regulator.

This document also concerns implementing systems and methods for operating a circuit. The methods comprise: supplying regulated power from an input power regulator to a passive energy storage device, a transient event detector, a timer circuit, and circuit component(s); detecting, by the transient event detector, an occurrence of a transient event (e.g., nuclear event); (responsive to the detecting) performing timer operations by the timer circuit to change a signal on a line connecting the timer circuit to the circuit component(s); using the signal to (i) cause supply of the regulated power to be discontinued to the passive energy storage device, the transient event detector, the timer circuit, and the circuit component(s), and (ii) cause power or energy storage devices of the circuit component(s) to be discharged to ground; supplying power from the passive energy storage device to the transient event detector and timer circuit during the transient event; and discontinuing the timer operations upon expiration of a pre-specified duration so that the regulated power is once again supplied to the passive energy storage device, the transient event detector, the timer circuit, and the circuit component(s).

BRIEF DESCRIPTION OF THE DRAWINGS

This disclosure is facilitated by reference to the following drawing figures, in which like numerals represent like items throughout the figures.

FIG. 4 provide a flow diagram an of illustrative method for operating a circuit in accordance with the present solution.

DETAILED DESCRIPTION

Figure 1:
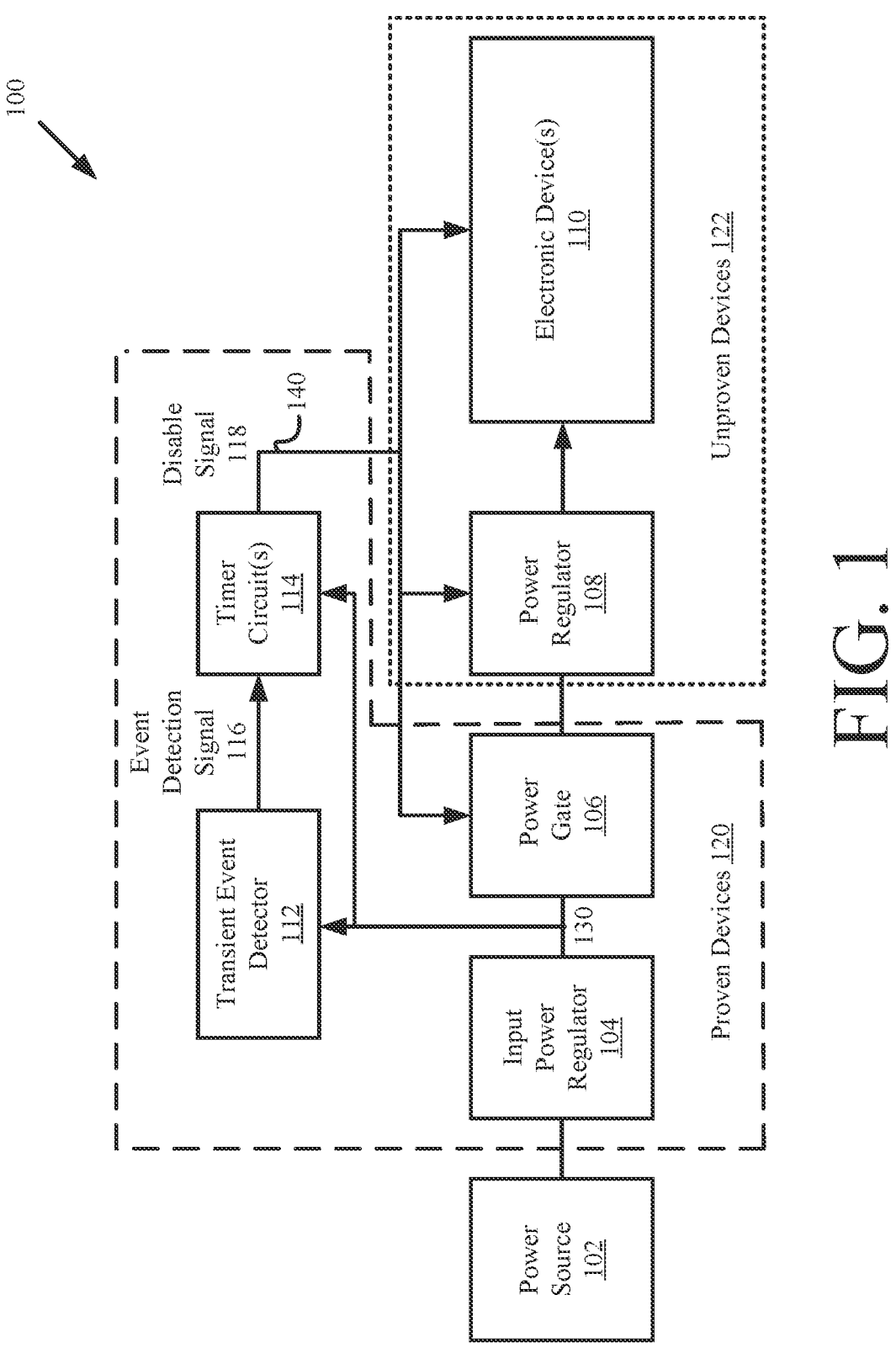
FIG. 1 provides an illustration of a system in which electronic device(s) are selectively supplied regulated input power.

It will be readily understood that the solution described herein and illustrated in the appended figures could involve a wide variety of different configurations. Thus, the following more detailed description, as represented in the figures, is not intended to limit the scope of the present disclosure but is merely representative of certain implementations in different scenarios. While the various aspects are presented in the drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

In intense radiation environments, electronic devices can be damaged and/or malfunction. One solution is to shut down and discharge power to as much of an electric device to prevent this damage and/or malfunction. Power may be kept off for the duration of the nuclear event and automatically switched back on afterwards. Implementing this solution requires detector and timer circuits to control the devices that isolate, shut down and discharge power. The detector and timer circuits require power to operate during the nuclear events. Finding devices that can provide power (i.e., operate) reliably in this environment is difficult and costly.

The present solution addresses this issue. The present solution can be used in various applications. Such applications include, but are not limited, to power storage device applications, integrated circuit applications, and other applications in which transient events may occur that could damage downstream electronic devices.

FIG. 1 provides an illustration of a system 100 implementing a solution to the above-mentioned issues associated with a nuclear environment. System 100 can include, but is not limited to, a communication device, a medical device (e.g., x-ray machine), a high-altitude electromagnetic pulse (HEMP) tested electronic device, or other system exposed to an environment that comprises short bursts of radiation with relatively high intensity levels.

In system 100, electronic device(s) is (are) supplied power from power source(s) 102. The power source(s) 102 can include, but is (are) not limited to, battery(ies), capacitor(s), vehicular power, landline and/or other types of power sources. The electronic device(s) 110 can include, but is (are) not limited to, general purpose processor(s), control system(s), sensor(s), computing device(s), communication system(s), and/or propulsion system(s). A power regulator 108 is optionally provided to adjust the power to reach a rated voltage range that can be tolerated by the downstream electronic device(s) 110. Power regulator 108 may not be provided in some scenarios, such as when the circuitry in 110 can operate at the same voltage as the circuitry in 112/114. The power regulator 108 and electronic device(s) 110 are not considered proven or radiation resistant devices, and therefore can be damaged if powered during nuclear events and/or lightning induced events. Components 108, 110 are referred to herein as unproven devices 122.

Various other circuit components are provided between the power source(s) 102 and the power regulator 108 for protecting the unproven devices 122 from damage due to nuclear events and/or lightning induced events. These other circuit components include an input power regulator 104 and a downstream power gate 106. Components 104, 106 are considered proven devices 120 that are inherently resistant to damage and/or malfunction caused by high levels of Gama radiation and/or neutron radiation in a surrounding environment. The input power regulator 104 is configured to adjust an input power to reach a rated voltage range that can be tolerated by the power gate 108 and other components 112, 114.

The power gate 106 is configured to shut-off or otherwise discontinue the supply of power from the power source(s) 102 to the unproven devices 108, 110 when a nuclear event occurs. The power gate 106 can include, but is not limited to, a relay or a transistor. The transistor may be configured to normally operate in a closed operational state and be selectively transitionable to an open operational state responsive to a control signal on line 140. Control of the power gate 106 is facilitated by a transient event detector 112 and a timer circuit 114. These components 112, 114 are powered by the regulated power 130 output from the input power regulator 104 even in times of a nuclear event. It should be noted that the transient event detector does not have to remain powered after detecting an event once it starts the timer. Components 112, 114 are also considered proven devices 120.

The transient event detector 112 is configured to (i) detect ionizing radiation above a threshold level, (ii) generate an event detection signal 116 responsive to the detection, and (iii) communicate the event detection signal 116 to the timer circuit(s) 114. The timer circuit(s) 114 is(are) configured to start generation of a disable signal 118 in response to the event detection signal 116. Line 140 may have (i) a relatively low voltage when the disable signal 118 is not being generated and (ii) a relatively higher voltage when the disable signal 118 is being generated. It should be noted that the polarity of the voltage could be easily inverted in an alternate implementation (e.g., high with no event and low during an event). Also, a voltage signal is only one method of implementing the circuit. The disable signal 118 is generated for a pre-specified amount of time. Upon expiration of the pre-specified amount of time, the timer circuit(s) 114 discontinue(s) generation of the disable signal 118. The pre-specified amount of time may be selected, for example, to be the duration of radiation presence starting from its detection and ending when the radiation level is such that it would not cause damage to the unproved devices 122. The downstream devices 108 and 110 are turned off or otherwise disabled when the disable signal 118 is being generated, and turned back on or otherwise re-enabled when the disable signal 118 is no longer being generated. The disable signal also causes any power or energy storage devices of blocks 108, 110 to be discharged to ground. The power or energy storage devices can include, but are not limited to, capacitors and/or power supplies.

As evident from the above discussion, system 100 implements a solution that relies on proven devices 120. For example, the input power regulator 104 is proven to regulate power during a nuclear event for the power gate 106, transient event detector 112 and timer circuit 114. Proving that the devices 120 operate correctly under these conditions is expensive, risky from a technical perspective, and limits the selection of devices that may be used in system 100. In some cases, the proven devices 120 can be replaced with radiation resistant devices. Radiation resistant devices often have a high size, weight, power and cost (SWaP-C) and have a limited selection of devices that can be used.

Figure 2:
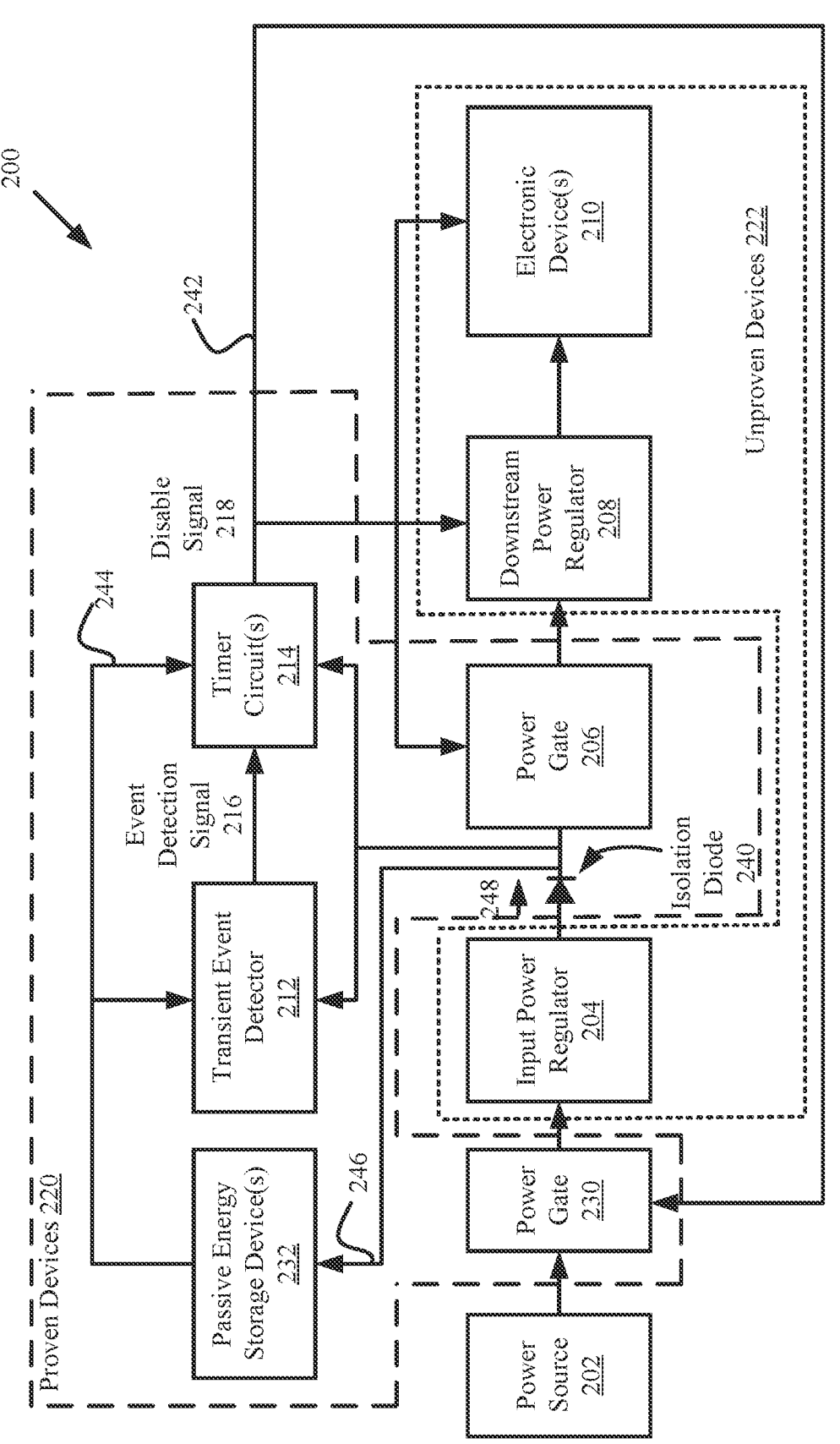
FIGS. 2-3 each provide an illustration of a system implementing the present solution.

FIG. 2 provides an illustration of a system 200 implementing another solution for overcoming the drawbacks of conventional systems in nuclear environments. Generally, system 200 utilizes passive energy storage device(s), isolated from the rest of the electronics, to power the transient event detector and timer circuit(s). This eliminates the need for the input power regulation function of input power regulator 104, which is a vulnerable electronic device, to operate during the event. By doing this, a more widely available, less expensive, and often more capable industrial solution can be chosen for this function. Radiation hardened devices for power regulation cost in the range of tens to thousands of dollars. The total cost of the industrial device that can be used in this implementation, plus the additional passive energy storage and isolation circuitry total a few dollars.

System 200 can include, but is not limited to, a communication device, a medical device (e.g., x-ray machine), a HEMP tested electronic device, or other system exposed to an environment that comprises short bursts of radiation with relatively high intensity levels. In system 200, electronic device(s) 210 is (are) supplied power from a power source 202. The power source 202 can include, but is not limited to, a battery, a capacitor, vehicular power, landline and/or other types of power source. The electronic device(s) 210 can include, but is (are) not limited to, general purpose processor(s), control system(s), sensor(s), computing device(s), communication system(s), and/or propulsion system(s). A power regulator 208 is optionally provided to adjust the power to reach a rated voltage range that can be tolerated by the downstream electronic device(s) 210. The power regulator 208 may be included in block 210. The power regulator 208 and electronic device(s) 210 are not considered proven or radiation resistant devices, and therefore can be damaged if powered during nuclear events and/or lightning induced events. Components 208, 210 are referred to herein as unproven devices 222.

Various other circuit components are provided between the power source 202 and the power regulator 208 for protecting the unproven devices 208, 210 from damage due to nuclear events and/or lightning induced events. These other circuit components include power gates 206, 230, an isolation diode 240, and an input power regulator 204. It should be noted that the isolation diode 240 can be replaced with other circuit elements such as, for example, a transistor or relay. Unlike the input power regulator 104 of FIG. 1, input power regulator 204 is considered an unproven device 222. Components 206, 230, 240 are considered proven devices 220 that are inherently resistant to damage and/or malfunction caused by high levels of ionizing radiation in the surrounding environment. The input power regulator 204 is configured to adjust an input power to reach a rated voltage range that can be tolerated by the power gate 206 and other components 212, 214, 232.

Figure 3:
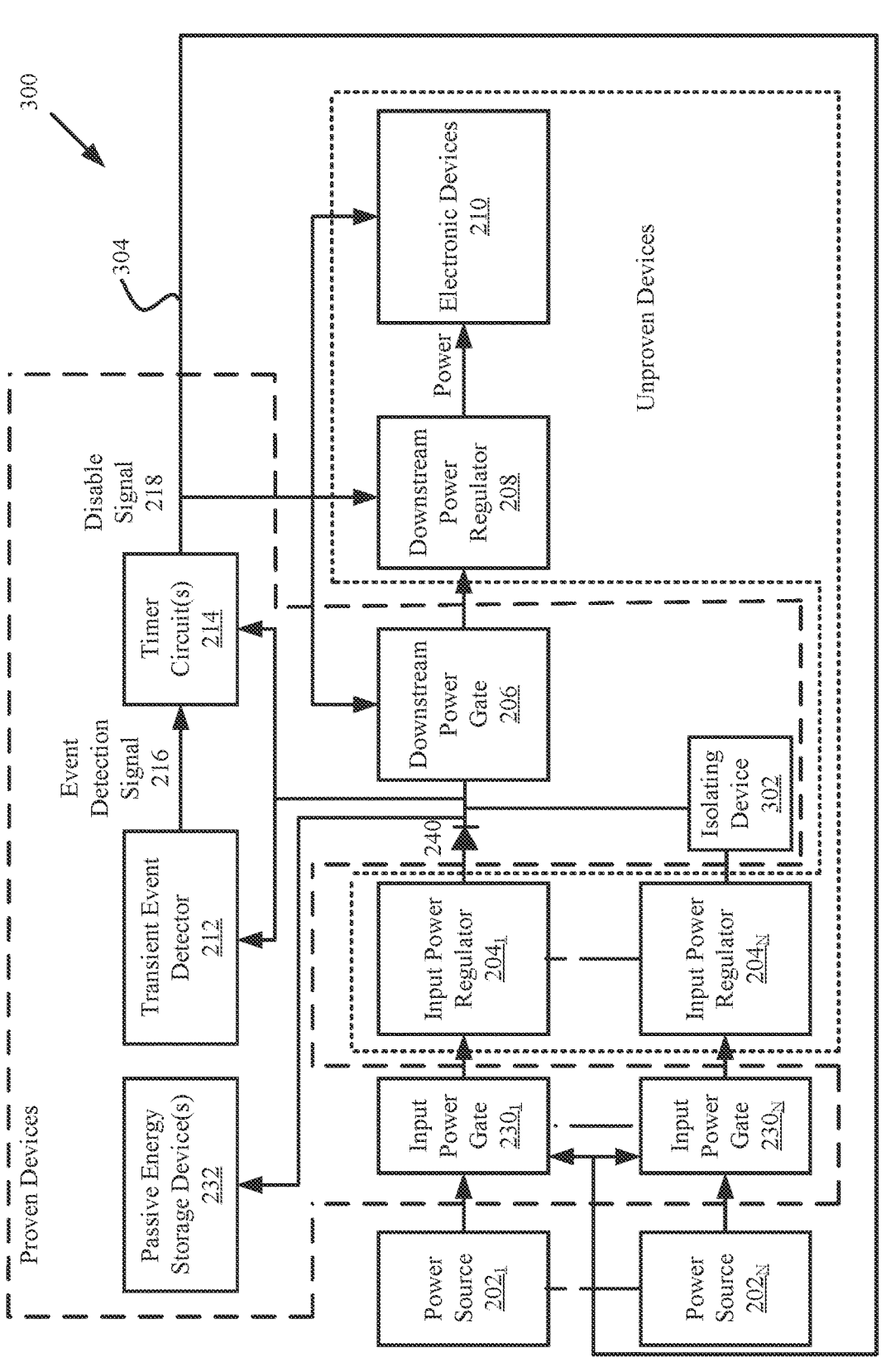

It should be noted that additional passive energy storage device(s) 232 is (are) provided to supply power to the transient event detector 212 and timer circuit(s) 214 during transient event occurrences. The passive energy storage device(s) 232 can include, but is (are) not limited to, capacitor(s) and/or rechargeable battery(ies). The passive energy storage device(s) 232 is (are) charged or re-charged using power from the power source 202 during normal operation of the system 200. When the passive energy storage device(s) 232 comprise batteries, the power may be supplied to components 212, 214 via line 244. The present solution is not limited in this regard. For example, if the passive energy storage device(s) 232 comprise capacitor(s), the power may be supplied to components 212, 214 via line 246. In this case, system 200 may be absent of line 244 as shown in FIG. 3.

Power gate 230 is configured to shut-off or otherwise discontinue the supply of power from the power source 202 to the downstream devices 204, 206, 208, 210, 212, 214, 232 when a transient event occurs. Power gate can include, but is not limited to, a relay or a transistor. The transistor may be configured to normally operate in a closed operational state and be selectively transitionable to an open operational state responsive to a disable signal 218 on line 242. Control of the power gate 230 is facilitated by the transient event detector 212 and a timer circuit 214. These components 212, 214 are powered by the passive energy storage device(s) 232 during times of nuclear event occurrences. Components 206, 212, 214, 230, 232 are also considered proven devices 220.

The isolation diode 240 is provided to ensure that the input power regulator 204 is electrically isolated from the passive energy storage device(s) 232 such that current is allowed to flow only in one direction shown by arrow 248. In effect, power is preventing from backfeeding the input power regulator 204, which during the event is unpowered and might be in a latch-up condition. A crowbar may be provided between the input power regulator 204 and the isolation diode 240 to dissipate any energy at this node during nuclear events.

The power gate 206 is configured to prevent the supply of power from the passive energy storage device(s) 232 to the downstream devices 208, 210 during transient events. Power gate 206 can include, but is not limited to, a relay or a transistor. The transistor may be configured to normally operate in a closed operational state and be selectively transitionable to an open operational state responsive to a disable signal 218 on line 242. Control of the power gate 206 is facilitated by the transient event detector 212 and a timer circuit 214.

The transient event detector 212 is configured to (i) detect ionizing radiation above a threshold level, (ii) generate an event detection signal 216 responsive to the detection, and (iii) communicate the event detection signal 216 to the timer circuit(s) 214. The timer circuit(s) 214 is(are) configured to start generation of a disable signal 218 in response to the event detection signal 216. Line 242 may have (i) a relatively low voltage when the disable signal 218 is not being generated and (ii) a relatively higher voltage when the disable signal 218 is being generated. The disable signal 218 is generated for a pre-specified amount of time. Upon expiration of the pre-specified amount of time, the timer circuit(s) 214 discontinue(s) generation of the disable signal 218. The pre-specified amount of time may be selected, for example, to be the duration of radiation presence starting from its detection and ending when the radiation level is such that it would not cause damage to the unproved devices 222.

The downstream devices 208 and 210 are turned off or otherwise disabled when the disable signal 218 is being generated, and turned back on or otherwise re-enabled when the disable signal 218 is no longer being generated. The disable signal also causes any power or energy storage devices of blocks 204, 208, 210 to be discharged to ground. The power or energy storage devices can include, but are not limited to, capacitors and/or power supplies.

The following features of system 200 allows it to operate correctly for the duration of the transient event: (i) the duration of the disable signal's generation, (ii) the design of the timer circuit(s) 214 and transient event detector 212 to be tolerant to changing input voltage, (iii) size of the passive energy storage device(s) 232, and (iv) a diode 240 that provides isolation of the passive energy storage(s) 232 from components 204, 206 and isolation for the disabled electronic components 208, 210. Additional proven or hardened circuitry can also be powered if required by the passive energy storage(s) 232.

In comparison to system 100 of FIG. 1, system 200 comprises additional circuit components 230, 232, 240 included in the proven devices. However, these additional circuit components are simple inexpensive passive devices which are inherently tolerant to the nuclear environment. Additionally, it should be noted that, in system 200, the input power regulator 204 is in complete isolation and shut down when the disable signal 218 is being generated. This is not the case in system 100 of FIG. 1. Instead, in system 100, the input power regulator 104 is always operational such that the regulated power output therefrom is used to power the transient event detector 112 and timer circuit(s) 114 during transient events. This is an important difference between system 200 and system 100. For example, in system 200, the input power regulator 204 comprises an unproven device (rather than a proven device) that can survive a nuclear event without having to operate through it. As such, the overall cost of system 200 is reduced compared to system 100 even with the inclusion of additional circuit components 230, 232, 240.

The input power gate, input power regulator and isolation diode can be duplicated for multiple input power sources. An illustration of such a system 300 is shown in FIG. 3. System 300 comprises a plurality of power sources 202₁, . . . , 202_N, a plurality of input power gates 230₁, . . . , 230_N, and a plurality of input power regulators 204₁, . . . , 204_N. N is any integer greater than one. The power sources 202₁, . . . , 202_N can include, but are not limited to, a switch mode power supply with a buck converter to step-down or decrease a voltage, a switch mode power supply with a voltage booster to step-up or increase a voltage, and/or other types of power supplies. The input power gates $230_1, \ldots, 230_N$ can be of the same or different types. For example, input power gate $230_1$ may comprise a first type of transistor while input power gate $230_N$ may comprise a second type of transistor.

The same or different isolating device can be used to isolate the input power regulator from the passive energy storage device during transient events. For example, the isolating diode 240 is provided between the input power regulator $204_1$ and components 206, 212, 214, 232, while a different type of isolating device 302 is provided between the input power regulator $204_N$ and components 206, 212, 214, 232. The isolating device 302 can include, but is not limited to, a transistor or integrated circuit. The present solution is not limited to the particulars of this example.

Both systems 200 and 300 implement the following novel feature of the present solution: the complete isolation and shutdown of the input power regulator function. This novel feature is made possible by the combination of: storage of a relatively large amount of energy using passive technology for the specific purpose of powering the transient event detector and time circuit(s) through transient events; and the isolation, triggered by the transient event detector and controlled by the timer circuit, of this stored energy from the rest of the electronics such that it is not dissipated elsewhere.

FIG. 4 provides a flow diagram of an illustrative method 400 for operating a circuit (e.g., system 200 of FIG. 2 or 300 of FIG. 3). Method 400 begins with 402 and continues with 404 where regulated power is supplied from an input power regulator (e.g., input power regulator 204 of FIG. 2, $204_1, \ldots$, or $204_N$ of FIG. 3) to a passive energy storage device (e.g., passive energy storage device 232 of FIGS. 2 and/or 3), a transient event detector (e.g., transient event detector 212 of FIGS. 2 and/or 3), a timer circuit (e.g., timer circuit(s) 214 of FIGS. 2 and/or 3), and downstream circuit component(s) (e.g., components 206, 208 and/or 210 of FIGS. 2 and/or 3). The input power regulator and the downstream circuit component(s) may comprise unproven devices susceptible to damage during the transient event. The passive energy storage device, transient event detector and timer circuit may comprise proven devices inherently resistant to damage and/or malfunction caused by the transient event.

Next in 406, the transient event detector detects an occurrence of a transient event in accordance with known techniques. The transient event can include, but is not limited to, a nuclear event. When such a detection is made, method 400 continues with the operations of block 408. Block 408 involves performing timer operations by the timer circuit to change a voltage on a line (e.g., line 242 of FIG. 2 or 304 of FIG. 3) connecting the timer circuit to the downstream circuit component(s).

The changed voltage may be used for various purposes as shown by blocks 410-414. In block 410, the changed voltage is used to cause the supply of the regulated power to be discontinued to the passive energy storage device, a transient event detector, a timer circuit, and the downstream circuit component(s). This can be achieved, for example, by causing an electrical isolation of an input power source (e.g., power source 202 of FIG. 2, $202_1, \ldots$, and/or $202_2$ of FIG. 3) from the passive energy storage device, the transient event detector and the timer circuit. The electrical isolation may be achieved by controlling a power gate (e.g., power gate 230 of FIG. 2, $230_1, \ldots$, and/or $230_2$ of FIG. 3) to create an open circuit condition between the input power source and the input power regulator. Block 410 may also involve isolation of the input power regulator.

In block 412, the changed voltage is used to electrically isolate the downstream electronic component(s) from the passive energy storage device. The electrical isolation can be created by control a power gate (e.g., power gate 206 of FIGS. 2 and/or 3) to transition to an open circuit condition, wherein the power gate is connected between the input power regulator and the at least one downstream circuit component.

In block 414, the changed voltage is used to power or energy storage devices of the downstream circuit component(s) to be discharged to ground. Upon completing 414, method 400 continues to block 416.

Next block 416 involves supplying power from the passive energy storage device to the transient event detector and timer circuit during the transient event. Power is prevented in block 418 from being supplied from the passive energy storage device to the input power regulator during the transient event. This can be achieved by, for example, providing a diode or a transistor connected between the input power regulator and the passive energy storage device. The timer operations are discontinued upon expiration of a pre-specified duration, as shown by block 410. Subsequently, method 400 ends or other operations are performed as shown by block 422. The other operations can include, but are not limited to, returning to block 404 so that the regulated power once again being supplied to the passive energy storage device, the transient event detector, the timer circuit, and the downstream circuit component(s).

As evident from the above discussion, the passive energy storage device is configured to supply an amount of power that operates or otherwise enables the transient event detector and timer circuit through the transient event, while an input power source is electrically isolated from the passive energy source, the transient event detector and the timer circuit. This is an important feature of the present solution since it prevents damage and/or malfunction of the system during transient events.

This document concerns a circuit. The circuit comprises: an input power source; an input power regulator connected to the input power source and configured to supply regulated power to circuit component(s); a transient event detector configured to detect a transient event (e.g., a nuclear event); and a timer circuit configured to change a signal on a line connecting the timer circuit to the circuit component(s) when the transient event is detected. The change of the signal may (i) cause supply of the regulated power to be discontinued, (ii) cause power or energy storage devices of the circuit component(s) to be discharged to ground, and (iii) cause an electrical isolation of the input power source from a passive energy storage device, the transient event detector and the timer circuit. The passive energy storage device is configured to supply an amount of power to operate the timer circuit at least through the transient event, while the input power source is electrically isolated therefrom. The electrical isolation may be provided by a power gate creating an open circuit condition between the input power source and the input power regulator.

The power gate is configured to be inherently resistant to damage and/or malfunction during the transient event. The input power regulator and the circuit component(s) may be susceptible to damage and/or malfunction during the transient event. The passive energy storage device, the transient event detector and the timer circuit may also be configured to be inherently resistant to damage and/or malfunction during the transient event.

The circuit may further comprise an isolation device configured to prevent power from being supplied from the passive energy storage device to the input power regulator during the transient event. The isolation device can include, but is not limited to, a diode or a transistor connected between the input power regulator and the passive energy storage device.

This document also concerns implementing systems and methods for operating a circuit. The methods comprise: supplying regulated power from an input power regulator to a passive energy storage device, a transient event detector, a timer circuit, and circuit component(s); detecting, by the transient event detector, an occurrence of a transient event (e.g., nuclear event); (responsive to the detecting) performing timer operations by the timer circuit to change a signal on a line connecting the timer circuit to the circuit component(s); using the signal to (i) cause supply of the regulated power to be discontinued to the passive energy storage device, the transient event detector, the timer circuit, and the circuit component(s), and (ii) cause power or energy storage devices of the circuit component(s) to be discharged to ground; supplying power from the passive energy storage device to the transient event detector and timer circuit during the transient event; and discontinuing the timer operations upon expiration of a pre-specified duration so that the regulated power is once again supplied to the passive energy storage device, the transient event detector, the timer circuit, and the circuit component(s).

The method may also comprise using the signal to cause an electrical isolation of an input power source from the passive energy storage device, the transient event detector and the timer circuit; and/or using the signal to cause an open circuit condition to be created by a power gate connected between the input power regulator and the circuit component(s). The electrical isolation may be achieved by using the signal to cause an open circuit condition to be created by a power gate connected between the input power source and the input power regulator.

Additionally or alternatively, the method also comprises preventing power from being supplied from the passive energy storage device to the input power regulator during the transient event. The preventing may comprise using a diode or a transistor connected between the input power regulator and the passive energy storage device.

The input power regulator and the circuit component(s) may comprise unproven devices susceptible to damage during the transient event. The passive energy storage device, transient event detector and timer circuit may comprise proven devices inherently resistant to damage and/or malfunction caused by the transient event. The passive energy storage device is configured to supply an amount of power that operates the timer circuit at least through a nuclear event, while an input power source is electrically isolated from the passive energy source and the timer circuit.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A circuit, comprising:
an input power source;
an input power regulator connected to the input power source and configured to supply regulated power to at least one circuit component;
a transient event detector configured to detect a transient event;
a timer circuit configured to change a signal on a line connecting the timer circuit to the at least one circuit component when the transient event is detected, wherein the change of the signal (i) causes supply of the regulated power to be discontinued and (ii) causes power or energy storage devices of the at least one circuit component to be discharged to ground; and
a passive energy storage device configured to supply an amount of power to operate the timer circuit at least through the transient event, while the input power source is electrically isolated from the passive energy storage device and the timer circuit.

2. The circuit according to claim 1, wherein the transient event comprises a nuclear event.

3. The circuit according to claim 1, wherein the electrical isolation is provided by a power gate creating an open circuit condition between the input power source and the input power regulator.

4. The circuit according to claim 1, wherein the change of the signal further causes an open circuit condition to be created by a power gate connected between the input power regulator and the at least one circuit component.

5. The circuit according to claim 4, wherein the power gate is configured to be inherently resistant to damage and/or malfunction during the transient event.

6. The circuit according to claim 1, further comprising an isolation device configured to prevent power from being supplied from the passive energy storage device to the input power regulator during the transient event.

7. The circuit according to claim 1, wherein the isolation device comprises a diode or a transistor connected between the input power regulator and the passive energy storage device.

8. The circuit according to claim 1, wherein the input power regulator and the at least one circuit component are susceptible to damage and/or malfunction during the transient event.

9. The circuit according to claim 1, wherein the passive energy storage device, the transient event detector and the timer circuit are configured to be inherently resistant to damage and/or malfunction during the transient event.

10. A method for operating a circuit, comprising:
supplying regulated power from an input power regulator to a passive energy storage device, a transient event detector, a timer circuit, and at least one circuit component;

detecting, by the transient event detector, an occurrence of a transient event;

responsive to the detecting, performing timer operations by the timer circuit to change a signal on a line connecting the timer circuit to the at least one circuit component;

using the signal to (i) cause supply of the regulated power to be discontinued to the passive energy storage device, the transient event detector, the timer circuit, and the at least one circuit component, and (ii) cause power or energy storage devices of the at least one circuit component to be discharged to ground;

supplying power from the passive energy storage device to the timer circuit during the transient event; and discontinuing the timer operations upon expiration of a pre-specified duration so that the regulated power is once again supplied to the passive energy storage device, the transient event detector, the timer circuit, and the at least one circuit component.

11. The method according to claim 10, wherein the transient event comprises a nuclear event.

12. The method according to claim 10, further comprising using the signal to cause an electrical isolation of an input power source from the passive energy storage device, the transient event detector and the timer circuit.

13. The method according to claim 12, wherein the electrical isolation is achieved by using the signal to cause an open circuit condition to be created by a power gate connected between the input power source and the input power regulator.

14. The method according to claim 10, further comprising using the signal to cause an open circuit condition to be created by a power gate connected between the input power regulator and the at least one circuit component.

15. The method according to claim 10, further comprising preventing power from being supplied from the passive energy storage device to the input power regulator during the transient event.

16. The method according to claim 10, wherein the preventing comprises using a diode or a transistor connected between the input power regulator and the passive energy storage device.

17. The method according to claim 10, wherein the input power regulator and the at least one circuit component comprise unproven devices susceptible to damage during the transient event.

18. The method according to claim 10, wherein the passive energy storage device, transient event detector and timer circuit comprise proven devices inherently resistant to damage and/or malfunction caused by the transient event.

19. The method according to claim 10, wherein the passive energy storage device is configured to supply an amount of power that operates the timer circuit at least through a nuclear event, while an input power source is electrically isolated from the passive energy source and the timer circuit.

\* \* \* \* \*